C. E. LOGAN & A. R. BARNETT.
PLOW SHOVEL FASTENER.
APPLICATION FILED FEB. 10, 1911.
991,158.
Patented May 2, 1911.
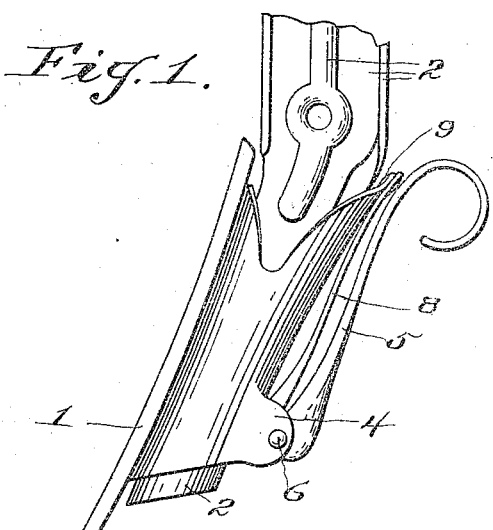
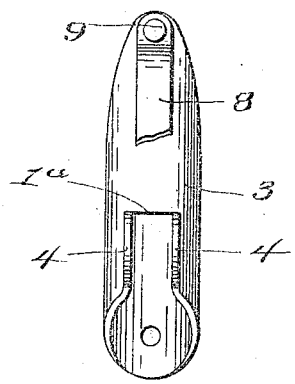
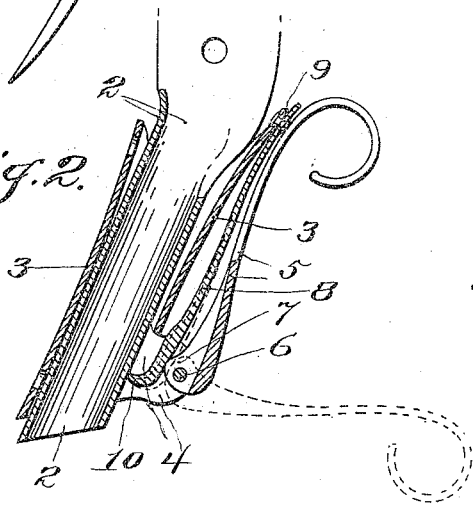
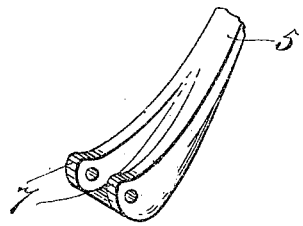
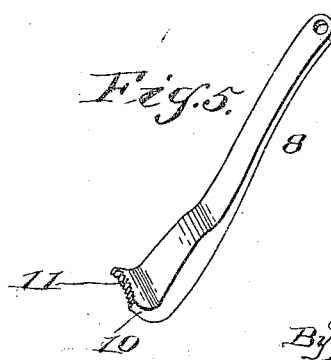
Witnesses
Wm. E. Valk Jr.
J. W. Bishop
Inventors
Charles E. Logan
and
Allen R. Barnett
By C. J. Belt, Attorney

UNITED STATES PATENT OFFICE.

CHARLES E. LOGAN AND ALLEN R. BARNETT, OF MILL GROVE, MISSOURI.

PLOW-SHOVEL FASTENER.

991,158. Specification of Letters Patent. Patented May 2, 1911.

Application filed February 10, 1911. Serial No. 607,733.

*To all whom it may concern:*

Be it known that we, CHARLES E. LOGAN and ALLEN R. BARNETT, citizens of the United States, residing at Mill Grove, in the county of Mercer and State of Missouri, have invented certain new and useful Improvements in Plow-Shovel Fasteners, of which the following is a specification.

This invention relates to plows and pertains especially to a device for attaching plow-points or shovels to plow-stocks, and it is designed as an improvement on our Patent No. 941,933, issued to us November 30, 1909.

The object of the present invention is to provide plow-points or shovels with simple and inexpensive means for attaching and detaching them to plow-stocks, and adapted to be expeditiously operated without the use of bolts, nuts and tools or implements in such operation.

A further object of the invention is to provide a plow-stock sleeve or holder of a plow-point or shovel, with a spring having a free end operated in the path of the stock by a cam-lever carried by such sleeve for engaging the stock.

A still further object of the invention is to provide a plow-stock holder or sleeve of a plow-point or shovel with a cam lever, and with a plate spring located between the sleeve and the lever and having one end secured to the holder or sleeve and the other end being operated by the lever against the plow-stock.

With these and various other objects in view, the invention consists in providing the sleeve or holder of a plow-point or shovel with a spring, one end of which is operated against the plow-stock for attaching the point or shovel thereto.

In the accompanying drawings forming part of this application: Figure 1 is a side elevation of part of a plow showing the application of the invention. Fig. 2 is a detail sectional view, the dotted lines showing the parts in released position. Fig. 3 is a rear view of the device with the spring partly broken away, and the lever removed. Fig. 4 is a detail perspective view of the cam-portion of the lever. Fig. 5 is a detail perspective view of the spring.

The same reference numerals denote the same parts throughout the several views of the drawings.

For the purpose of illustration, an ordinary plow-point or shovel 1, and an ordinary plow-stock 2 are employed. The point or shovel 1 is provided with an undivided or unsplit sleeve or holder 3, having a pair of lugs or ears 4 projecting therefrom, and a portion of the sleeve-wall terminates adjacent the ears 4, so as to leave an opening 1ª, between the ears for the purpose hereinafter fully described. A hand-lever 5 is pivoted between the ears 4 by means of a pin 6, and such lever has a cam-end 7. A plate-spring 8 has one end secured to the top of the sleeve at 9, and depends therefrom behind the cam-end 7 into the sleeve opening, hereinbefore referred to, where such depending or free end of the spring is operated by the cam-end of the lever 5. The said free end of the spring 8 has a concaved or segmental inturned portion 10, the face of which is serrated or provided with teeth 11 for engaging the plow-stock under pressure of the cam-lever.

It will be seen that the cam acts directly upon the free end of the spring, thereby forcing the serrated portion of the spring into engagement with the plow-stock; that the spring and the lever being permanently fixed to the shovel-sleeve, they are always in position for applying the shovel to the stock, without employing bolts or nuts, tools or implements in such application; and that the point or shovel may be varied in height, and turned to various lateral positions without removal from the stock, by simply throwing the lever to release the cam pressure on the spring, in which latter position the shovel or point may be placed or removed.

We do not wish to be understood as confining ourselves to any particular shape and size of spring, to the shape of the cam or cams, nor to the particular location of such parts with respect to the sleeve, as the same may be varied in making and in the practical application thereof under the scope of the claims herein.

Having thus described our invention what we claim as new and desire to secure by Letters Patent is:

1. A hand device for attaching and releasing plow-points or shovels, comprising a holder for a plow-stock and attached to the point or shovel, a spring attached to the holder, and means carried by the holder for operating the spring into and out of engagement with the plow stock.

2. A hand device for attaching and releasing plow-points or shovels, comprising a spring, means connecting the spring with the plow-point or shovel, and a cam-lever carried by such means for working the spring into and out of engagement with the plow-stock.

3. A hand device for attaching and releasing plow-points or shovels, comprising a holder for a plow-stock and attached to the point or shovel, a spring attached to the holder and having a free end working through the holder for engaging a plow-stock, and a cam-lever carried by the holder for operating the spring.

4. In a hand device for attaching and releasing plow-points or shovels, the combination, with a sleeve or holder attached to a point or shovel and having an opening therein for the operation of a spring, a spring having one end attached to the holder and depending into said opening, and a cam-lever pivoted opposite the opening for operating the spring in connecting and disconnecting the holder with a plow-stock.

In witness whereof we hereunto set our hands in the presence of two witnesses.

CHARLES E. LOGAN.
ALLEN R. BARNETT.

Witnesses:
Lon M. Young,
Thos. Braffett.